(12) United States Patent
Stillman

(10) Patent No.: US 7,357,639 B2
(45) Date of Patent: Apr. 15, 2008

(54) METHOD FOR COMMUNICATING USING PICTOGRAMS

(76) Inventor: Alan Stillman, Suite 200, 48 S. Early St., Alexandria, VA (US) 22304

( * ) Notice: Subject to any disclaimer, the term of this patent is extended or adjusted under 35 U.S.C. 154(b) by 8 days.

(21) Appl. No.: 11/287,407

(22) Filed: Nov. 28, 2005

(65) Prior Publication Data
US 2006/0084038 A1 Apr. 20, 2006

Related U.S. Application Data

(62) Division of application No. 10/812,909, filed on Mar. 31, 2004, now abandoned.

(60) Provisional application No. 60/510,130, filed on Oct. 14, 2003.

(51) Int. Cl.
*G09B 11/00* (2006.01)
(52) U.S. Cl. ...................... 434/112; 434/169
(58) Field of Classification Search ................ 434/112, 434/169; 283/46
See application file for complete search history.

(56) References Cited

U.S. PATENT DOCUMENTS

| | | | |
|---|---|---|---|
| 3,271,884 A | 9/1966 | Roberson | |
| 3,871,115 A | 3/1975 | Glass et al. | |
| 4,165,890 A | 8/1979 | Leff | |
| 5,169,342 A | 12/1992 | Steele et al. | |
| 5,275,818 A | 1/1994 | Kind | |
| 5,782,640 A | 7/1998 | Sandlin | |
| 6,056,549 A | 5/2000 | Fletcher | |
| 2003/0157465 A1* | 8/2003 | Kerns et al. | ................ 434/112 |

FOREIGN PATENT DOCUMENTS

| | | |
|---|---|---|
| CA | 1 181 313 | 1/1985 |
| EP | 0 068 935 A1 | 6/1982 |

OTHER PUBLICATIONS

KWIKPOINT: "What is Kwikpoint?", Feb. 5, 2002, XP002339218, p. 1, retrieved from the Internet: URL:hhtp://web.archive.org/web/20020205025447/kwikpoint.com/what.html>.
Jennifer Shaw: "The Latest Hot Destinations, Special Offers, and More—Personalized for YOU!", The Euro Vacationer, vol. 2, No. 15, 2001, pp. 1-5, XP-002339219, retrieved from the Internet: URL:http://www.eurovacations.com/news/evnews19.html>.

* cited by examiner

*Primary Examiner*—Kathleen Mosser
(74) *Attorney, Agent, or Firm*—Young & Thompson

(57) ABSTRACT

A device for communicating, preferably between two people who could not normally orally communicate, by at least one user pointing to pictograms on the device. The device can be a static medium having a plurality of icons thereon or can be part of a computer generated program having a graphic display that is either moving or stationary so that a user can select at least one icon to communicate an idea. When two or more people use the device to communicate, the device enables a dialogue to develop between the people. A first responder to an emergency situation could use the device in any country to gather information to quickly respond to the situation.

19 Claims, 24 Drawing Sheets

English words are next to certain pictures to aid clinician in usage.

Use to supplement interpreter communications.

Kwikpoint's effectiveness can be enhanced through gestures.

Overcome verbal impairments including aphasia.

Allows private communication.

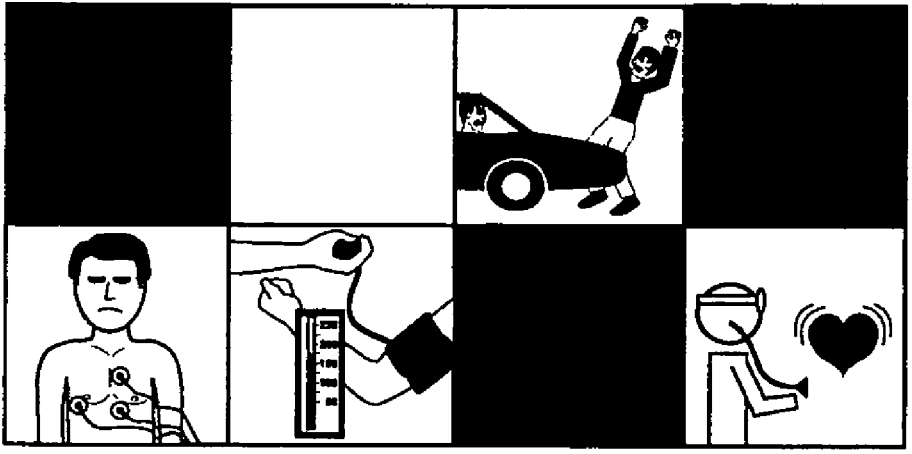

This card is for informational purposes only and is not a substitute for professional medical diagnosis, advice or medical interpretation.
Gaia Communications, Inc., and manufacturers assume no responsibility for any action(s) or lack of action the provider performs as a result of using this card.

Copyright © 2003 GAIA Communications Patent Pending www.kwikpoint.com
Manufactured and sold under license from Fastmark, Inc.
Palo Alto, California, USA. U.S. Patent No. 5,083,637

Figure 23

Visual
Language
Translator

METHOD FOR COMMUNICATING USING PICTOGRAMS

FIELD OF THE INVENTION

The present invention relates to a communication device. The device is used for communicating between language challenged people, for example, between two people that do not have a common language or between a first person and a second language impaired person.

BACKGROUND OF THE INVENTION

Communication devices of this type are known in general, especially as foreign travel aids. The inventor's prior invention is a language communicator having a plurality of pictograms on a plurality of foldable laminated sheets. A traveler may use this language communicator to attempt to communicate with people in a foreign country who do not speak the same language as the traveler.

The traveler would point to a specific pictogram that depicts a specific concept such as whether a room has a shower or a double bed. However, the above noted known communication device is limited to a general domain.

Other known language communication devices include flip charts that combine written language and pictograms such as U.S. Pat. No. 3,871,115 to Glass et al. However, language communicators of this type are limited to one specific language that a person is trying to communicate in. Specifically, if an English speaking person were attempting to communicate in Spanish he would use one translator, but if he wanted to communicate in French or some completely different language like Arabic, he would need a separate device. While this type of device may be acceptable for travel to a foreign country, a single device that is independent of written language would be more time efficient and cost efficient to convey a wider set of language concepts.

The idea of a language communicator is not restricted to a device that a person can carry with him such as the above foldable device, but can be used with other mediums such as a computer display. U.S. Pat. No. 5,169,342 to Steele et al. teaches an interactive method of communicating by arranging a plurality of icons in a row on a computer screen so that taken together, the plural icons form a sentence.

However, there is a still a need for a simple device to quickly and clearly communicate without any written language that can be used to communicate between people that each speak a different language or are unable to speak such that a plurality of different languages can be communicated using a single device.

SUMMARY OF THE INVENTION

It is an object of the invention to have a visual language communicator that overcomes the problems of the prior art.

Another object is to have a visual language communicator that can quickly and easily be used to translate a plurality of languages into a single language readily understood by the holder of the communicator.

Yet another object is to have a visual language communicator that can be employed using a variety of media.

Still yet another object to have a visual language communicator that is able to convey complex ideas by having enhanced graphics that accompany a pictogram denoting the idea.

Further yet another object is to have a communicator which, in use, not only allows one person to communicate with another person that does not speak the first person's language, but also allows the second person to communicate with the first person so that a dialogue can be established between the two people.

Further still another object is to have a communicator that can be used in any part of the world by first responders to an event to quickly and accurately make a determination of what happened to enable a fast response to assist a witness to the event or gather information from the event to respond to the event.

BRIEF DESCRIPTION OF THE DRAWINGS

Other further objects and advantageous features of the invention will be more readily apparent in connection with a detailed description of the drawings in which:

FIGS. 1-20 collectively represent a foldable translator;

FIG. 23 shows the translator of FIG. 21 completely folded; and

DETAILED DESCRIPTION OF THE PREFERRED EMBODIMENTS

Figure 1:
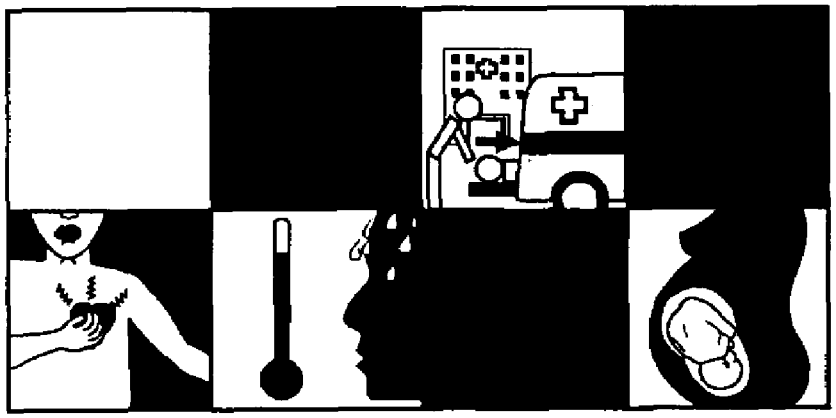
Figure 2:
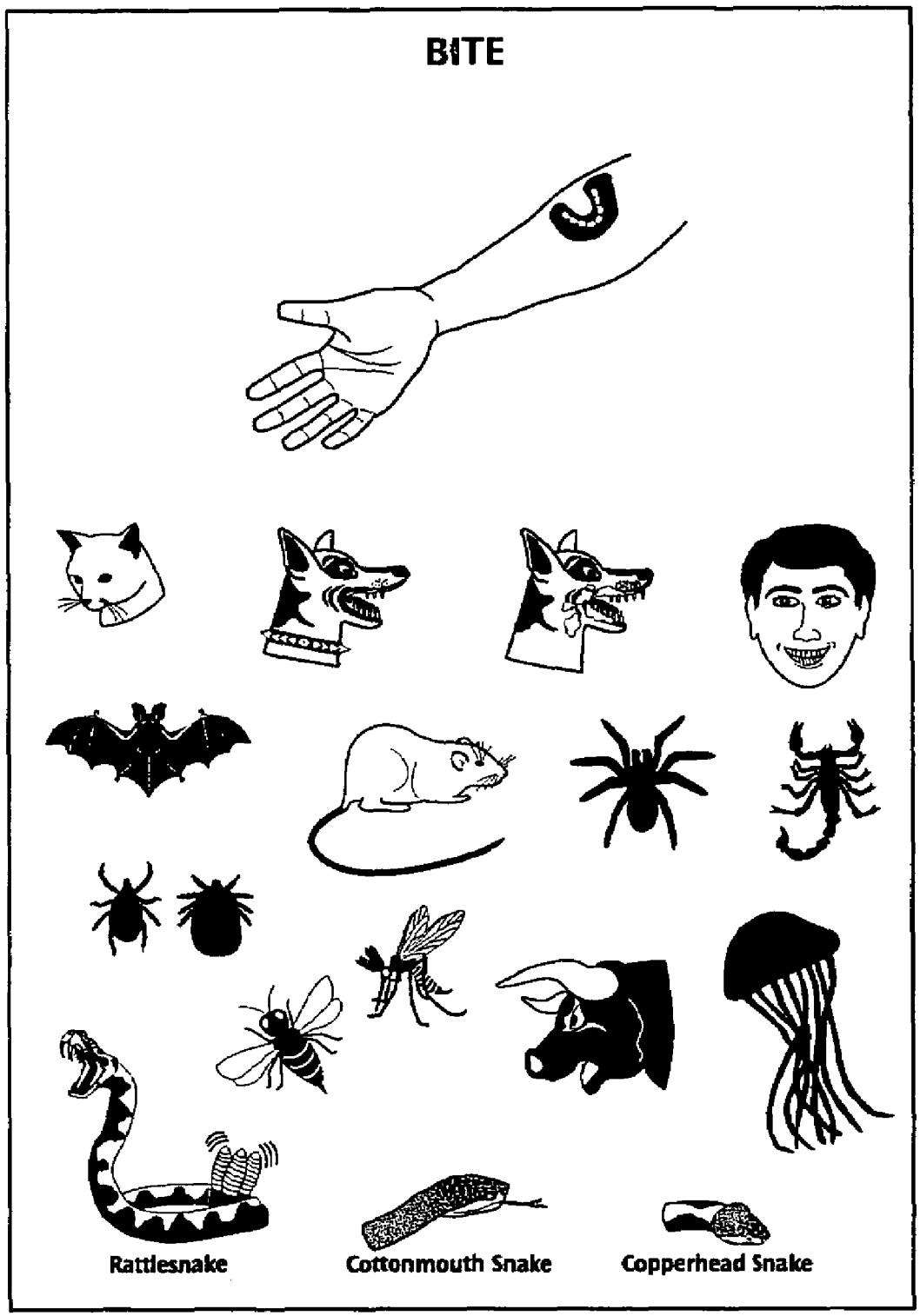

FIGS. 1 through 23 show a foldable pocket sized translator according to a first embodiment of the invention. FIGS. 1 though 20 show twenty panels that are connected together at respective edges as further seen in FIG. 21. Although ten panels having items depicted on front and rear sides are shown, a single panel or more than ten or any number in between can be used. Preferably, the amount of panels is less than twenty so that the panel can be accessed quickly and easily foldable to fit inside a user's pocket.

Figure 21:
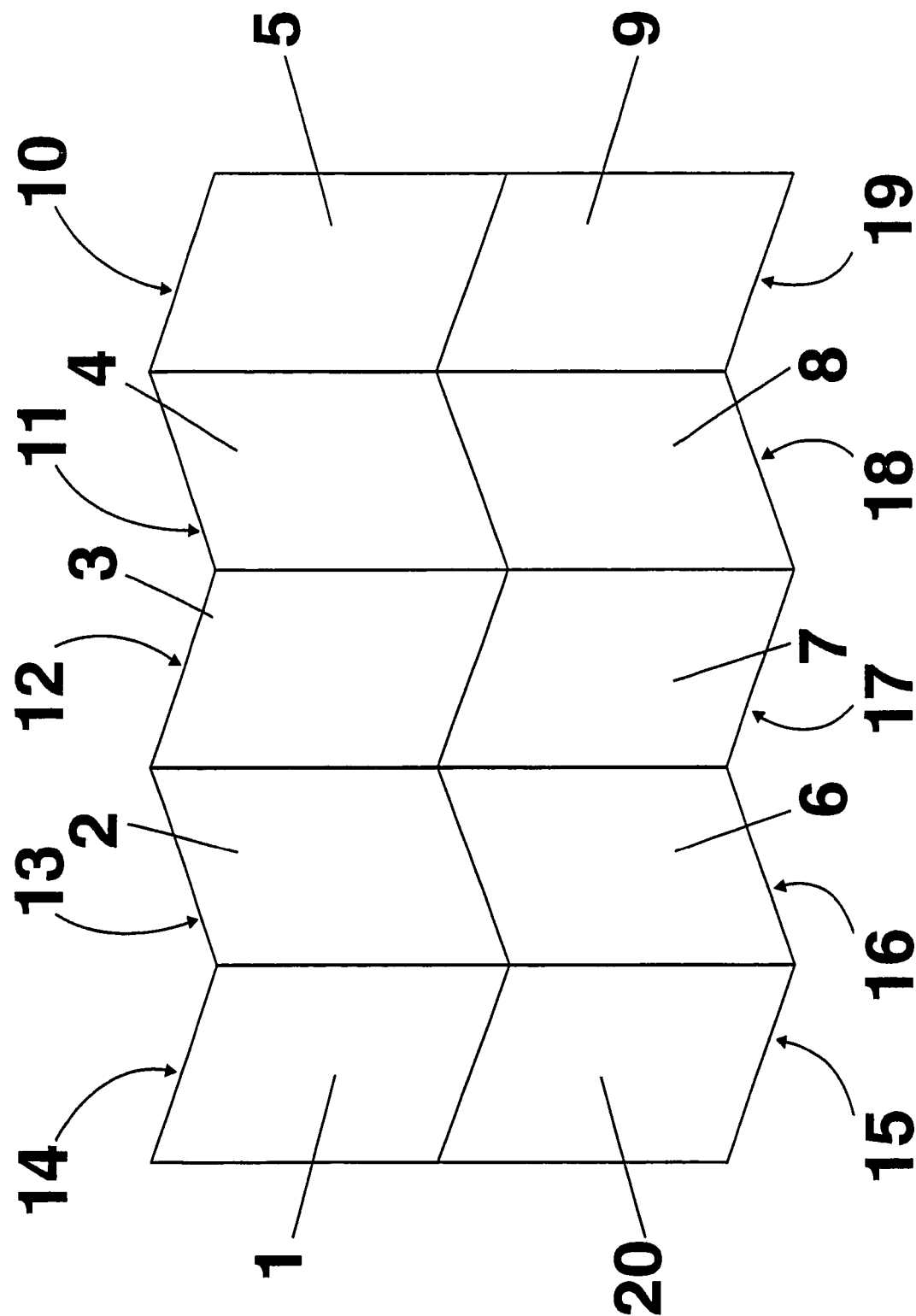
FIG. 21 shows FIG. 1-20 connected together as a foldable translator.

The panel 1 of FIG. 21 corresponds to FIG. 1 and denotes a cover for the device. However, a cover is not required and pictograms could be displayed on panel 1.

In the specific embodiment shown in FIGS. 1-20, the device is a medical visual language translator. However, the translator can take many different forms and be for example a military translator depicting military vehicles, flags of nations, weapons, modes of transportation, pictograms helping to identify a person or persons' physical characteristics and other information that a military person in a military scenario would find useful when trying to communicate with a person who does not speak the same language as the military person. The translator could also be specific to police personnel, or more specifically military police enforcement, school officials, CIA or FBI operatives, FEMA or other disaster relief responders, maritime communication or any other first responder to a specific scenario.

Accordingly, a first responder responding to an accident, a military incident, a crime, a natural disaster or the like preferably uses the visual language translator to assist in helping at the scene of the event.

In the embodiment of the medical visual language translator of FIGS. 1 through 20, FIGS. 2 through 18 depict pictograms related to a medical emergency such that a user of the medical visual language translator can respond quickly to the medical emergency.

Unlike previous communication devices, the visual language translator of the present invention can be used as easily in the United States as overseas. Specifically, an emergency medical technician (EMT) could carry the medical visual language translator to communicate with a foreign speaking person or to a person that cannot speak due to the medical emergency or for some other reason or even to communicate to a person who is deaf.

At the scene of the medical emergency, the EMT would present the translator to the victim or a bystander to attempt to communicate with the victim or bystander. Since the visual translator is laid out in an organized fashion, the communication would be quick and accurate to provide assistance without delay.

Various medical emergencies are denoted in FIGS. 2-4 and 6-8. Each of these figures includes a larger pictogram related to a general concept and a plurality of smaller pictograms depicting a specific concept related to the general concept.

Figure 3:
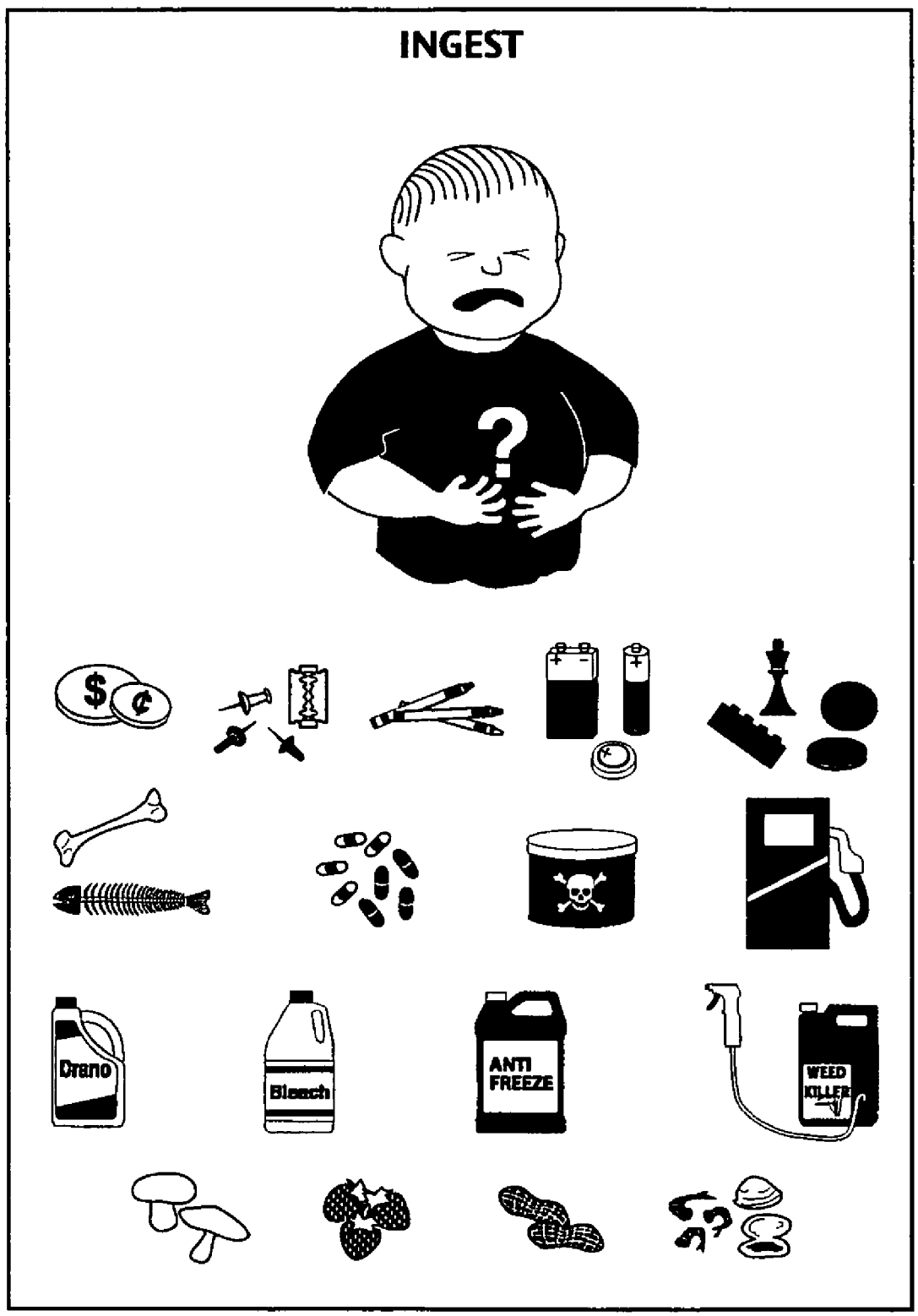
Figure 4:
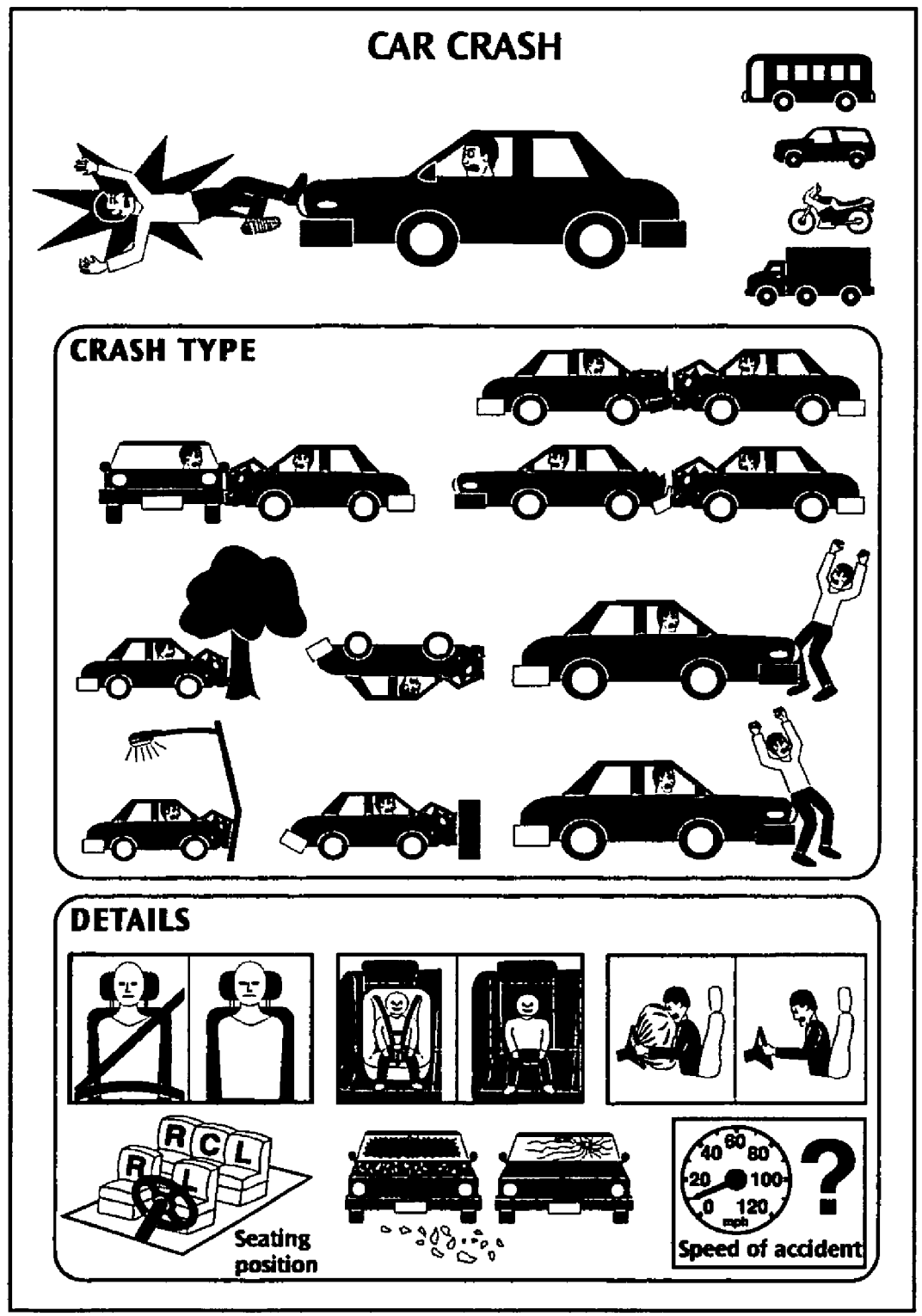

For example, as seen in FIG. 3, a child may have ingested something that has made him ill. The victim or bystander pointing to the child in the pictogram would convey a general understanding of what happened and would immediately convey this concept to the EMT. Accordingly, the relatively larger pictogram of an ill child is the general concept that is easily understood by the victim or bystander and stands out from the other pictograms because of the relatively larger size of this pictogram. The victim or bystander would then point to a specific cause of the child's illness so that the EMT could provide specific treatment. There is no need to flip any pages or go to an adjacent page, because the general concept and the specific concept related to the general concept are on the same panel for quickly treating the emergency.

Figure 5:
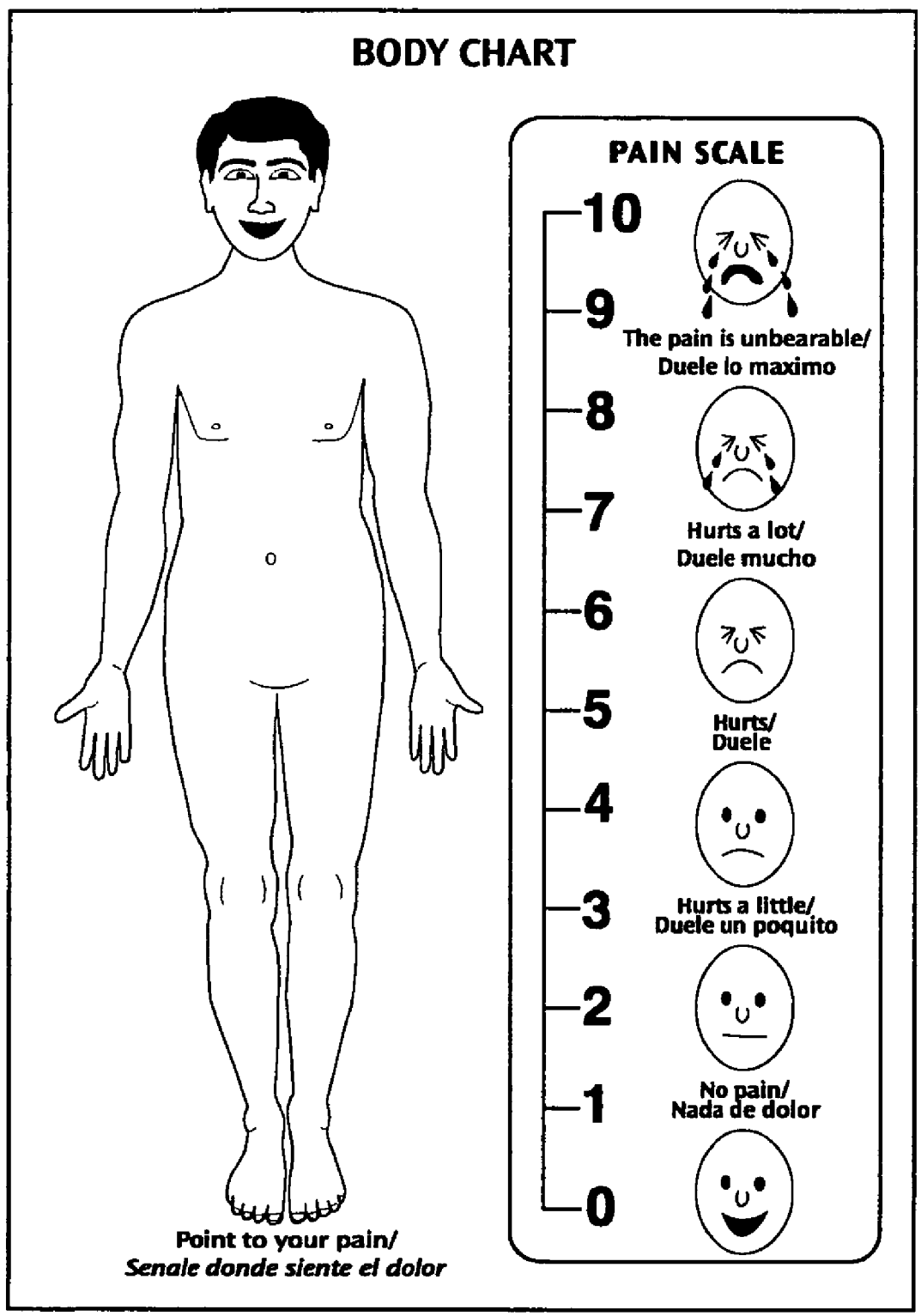
Figure 6:
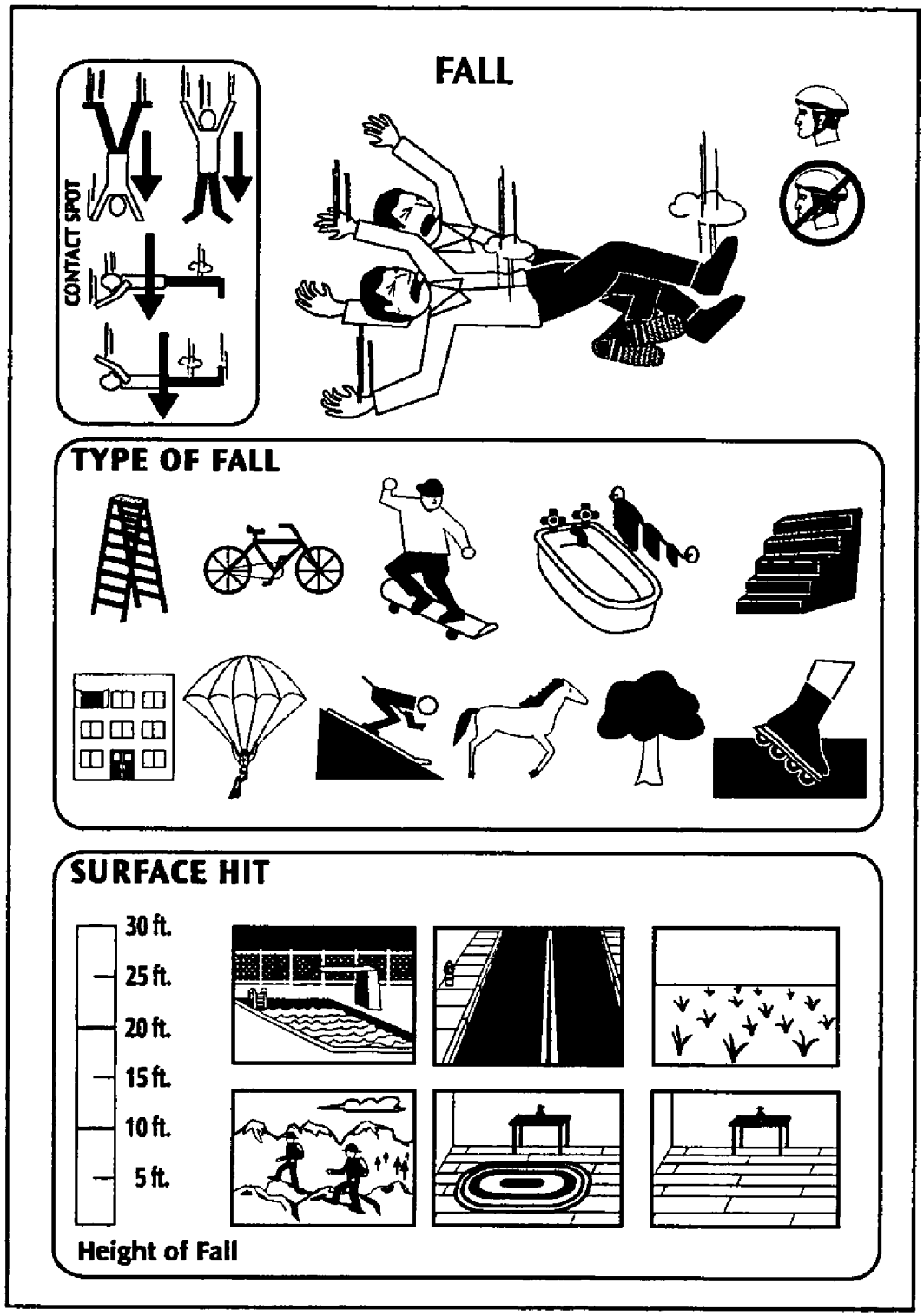
Figure 7:
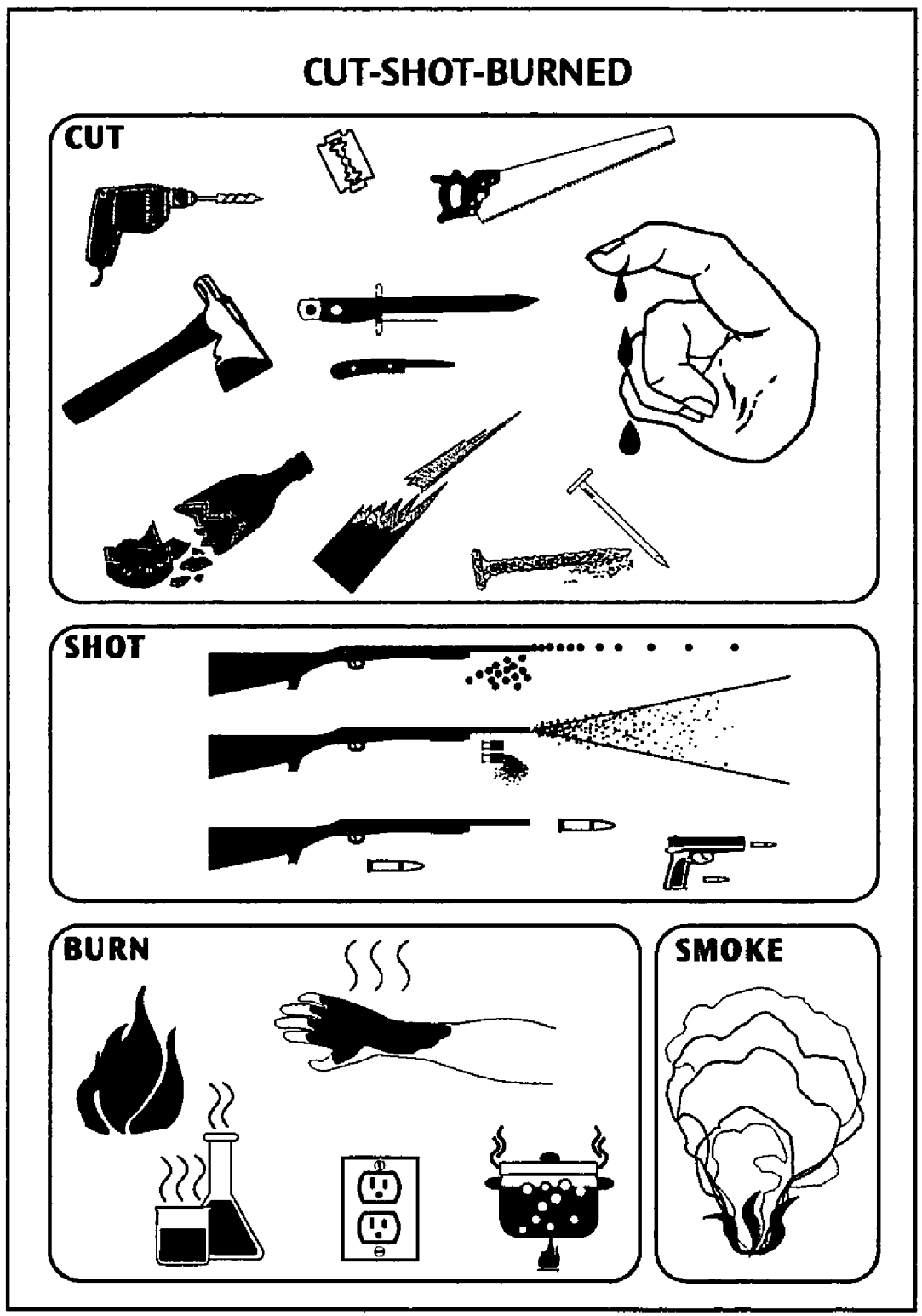
Figure 8:

If the child is able to point to the communicator, panel 5 depicted in FIG. 5 shows a pain scale with pictograms showing differing levels of pain. A numerical scale or short English or non-English language phrases or a combination of any of these items may accompany the pictograms to aid in communication.

Figure 9:
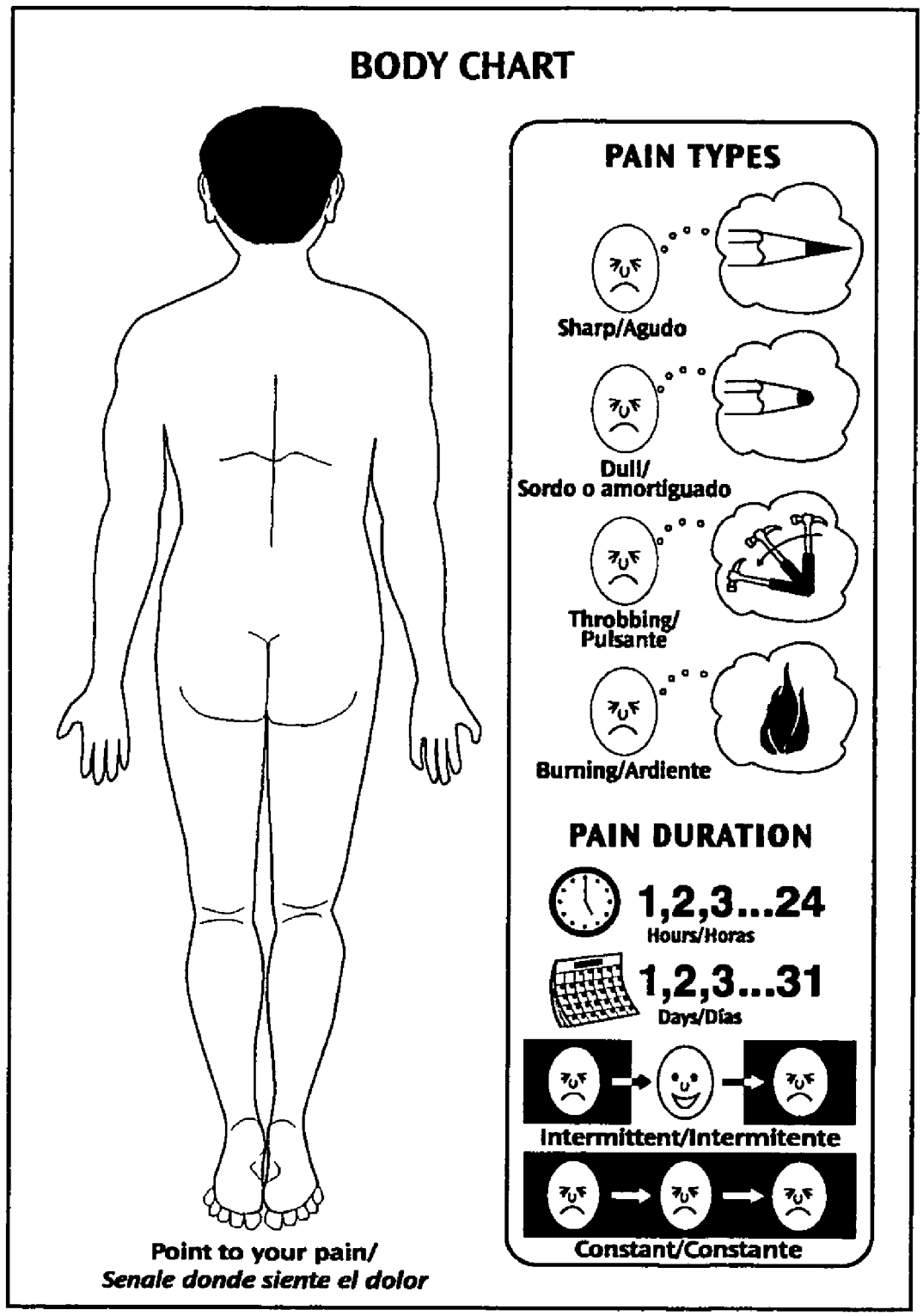

As seen in FIG. 9, if the EMT was not immediately on the scene, pain type and duration can be communicated by pointing to the pictograms in FIG. 9.

Figure 10:
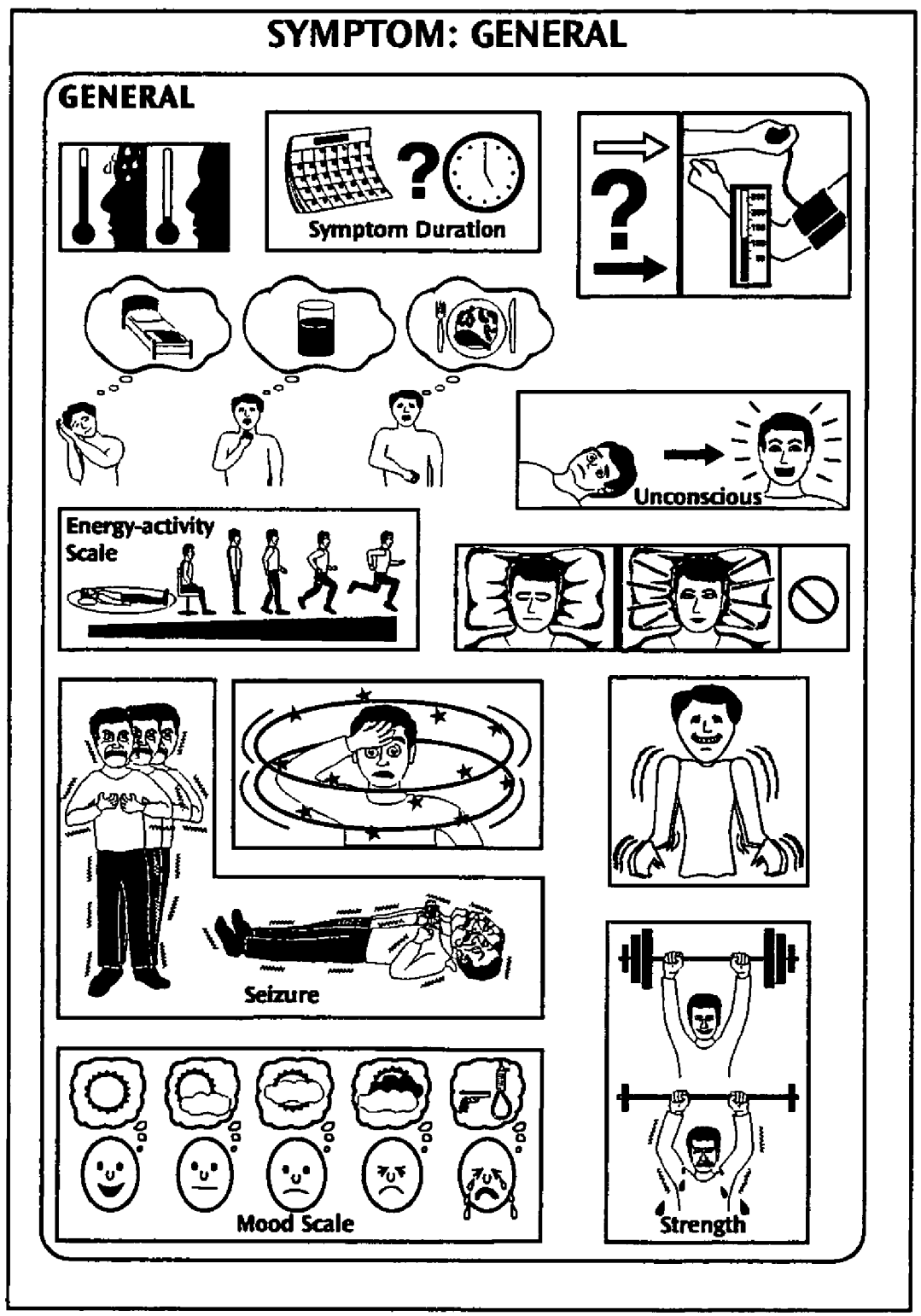

The visual language translator can be folded so that panels that are not normally adjacent one another become adjacent one another to provide additional information. For example, panel 10 as seen in FIG. 10 can be folded to be immediately adjacent panel 3 that has FIG. 3 thereon. In this manner, the EMT can assess general symptoms of the child that flow in a logical sequence from FIG. 3, so that the EMT does not have to flip the translator over to communicate. From this it can be seen that here is communication between the victim and/or the bystander and the EMT and also vice versa so that a dialogue is established.

In addition, as seen in FIG. 10, some of the pictograms have attributes that connote additional meaning. Specifically, squiggly lines and blurred images help provided added meaning to emphasize that the pictogram denotes a seizure. These attributes can also be seen in FIG. 19, which depicts further pictograms for symptoms that are body part specific.

Figure 11:
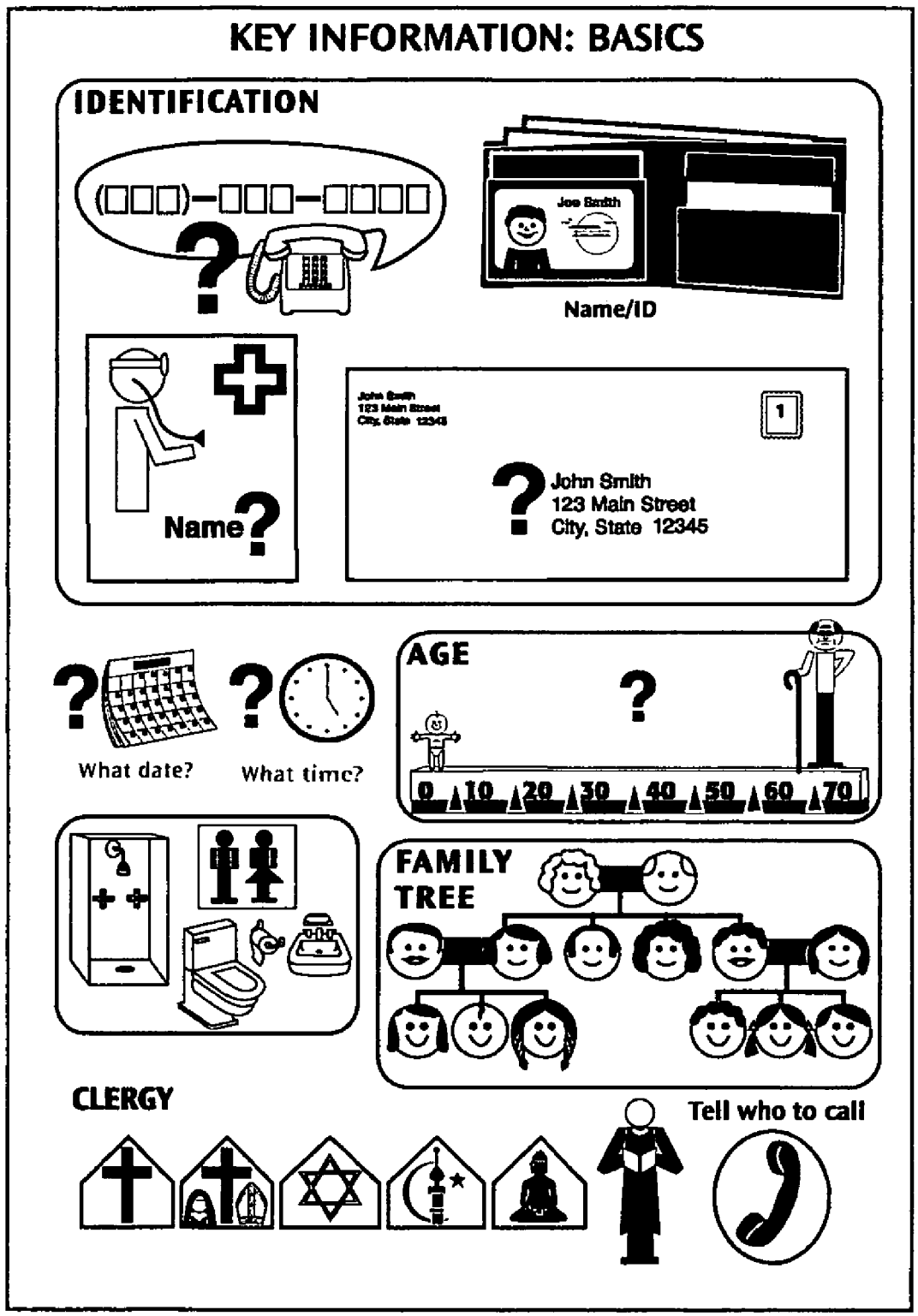
Figure 18:
Figure 19:
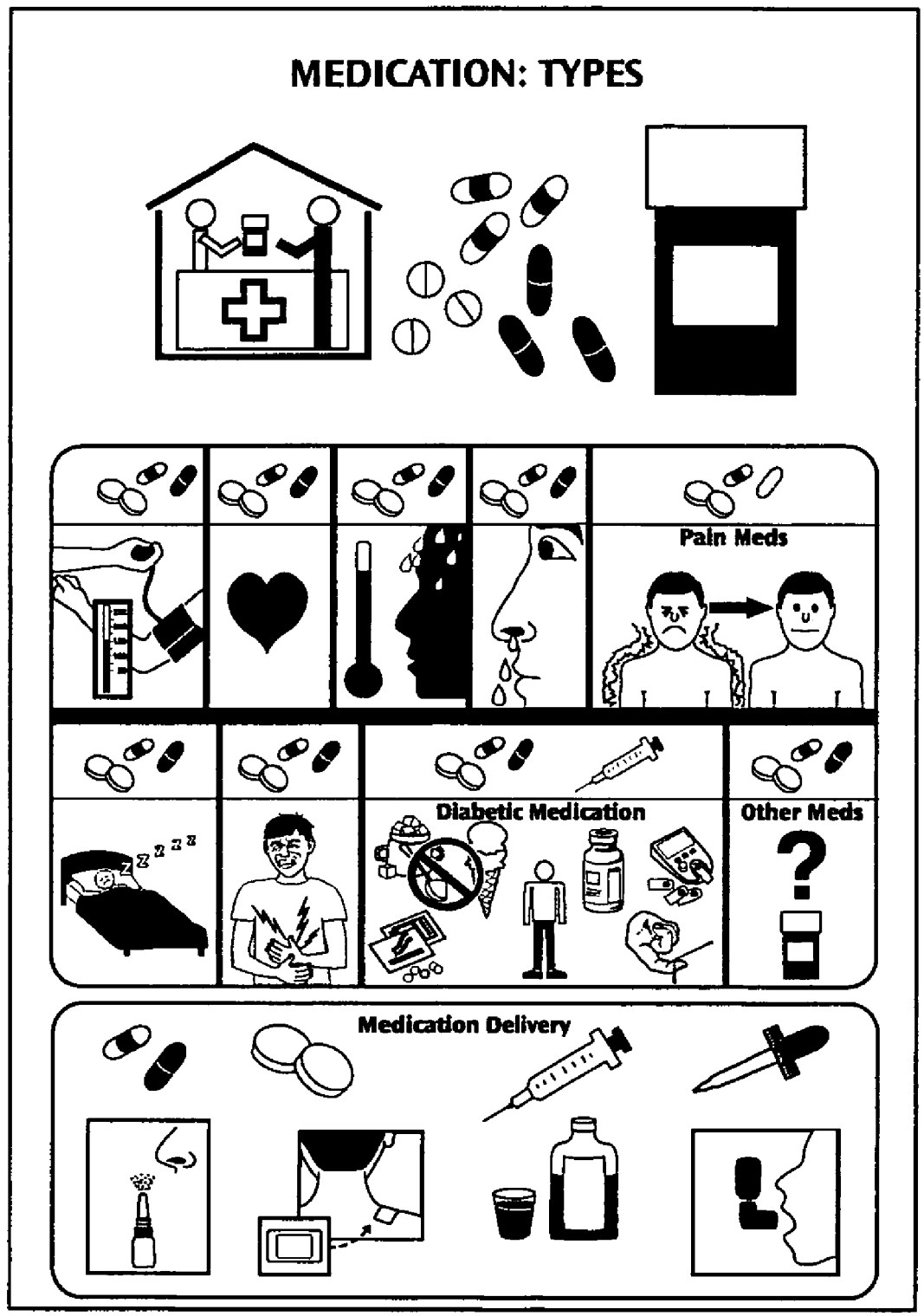

Other panels depict information that may be communicated if the victim needs to be admitted to a hospital, such as personal information depicted in FIG. 11 or background information as depicted in FIG. 18.

Figure 12:
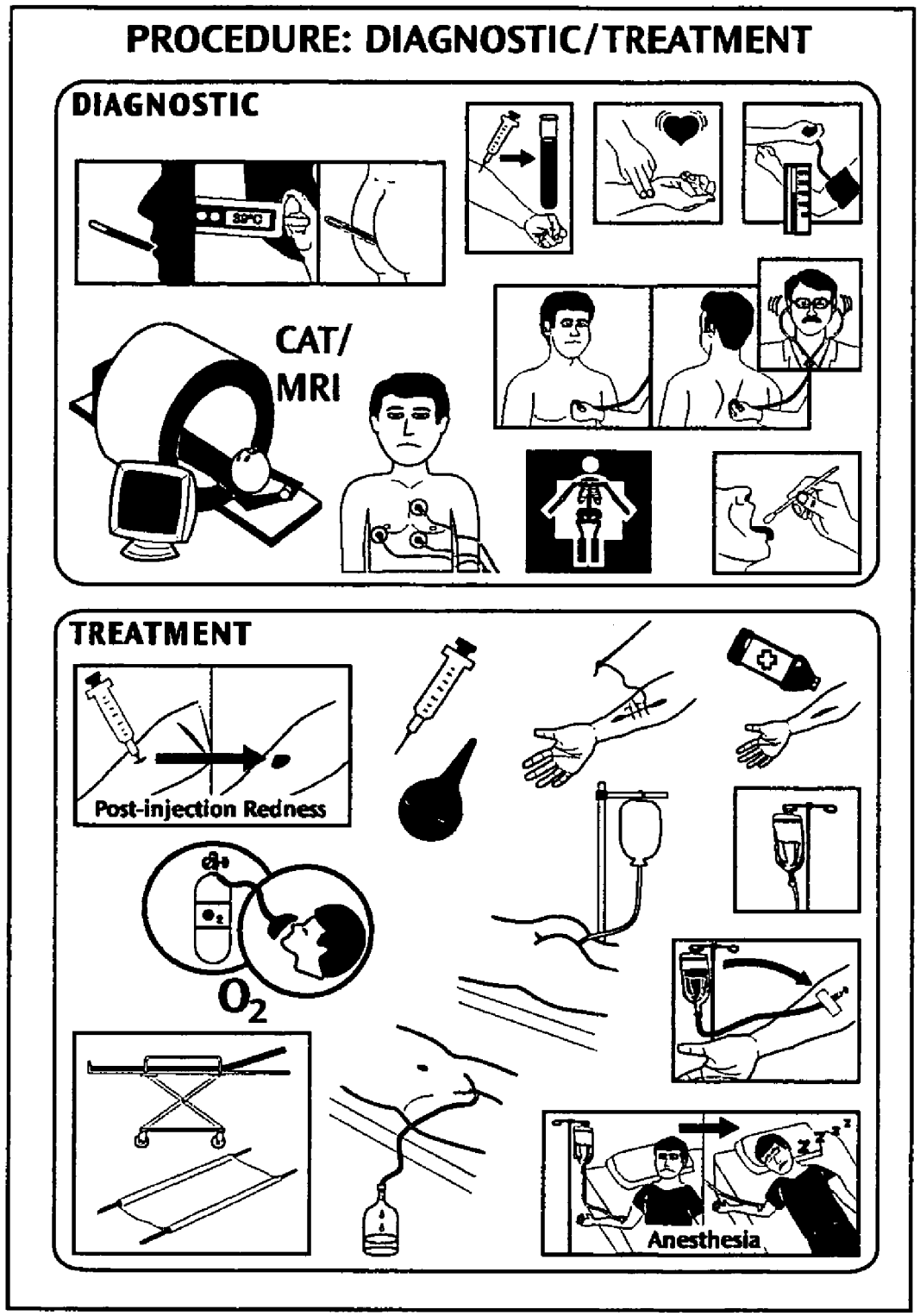

The medical visual language translator can also be used to communicate the treatment to be performed as seen in FIG. 12, for example.

Figure 13:
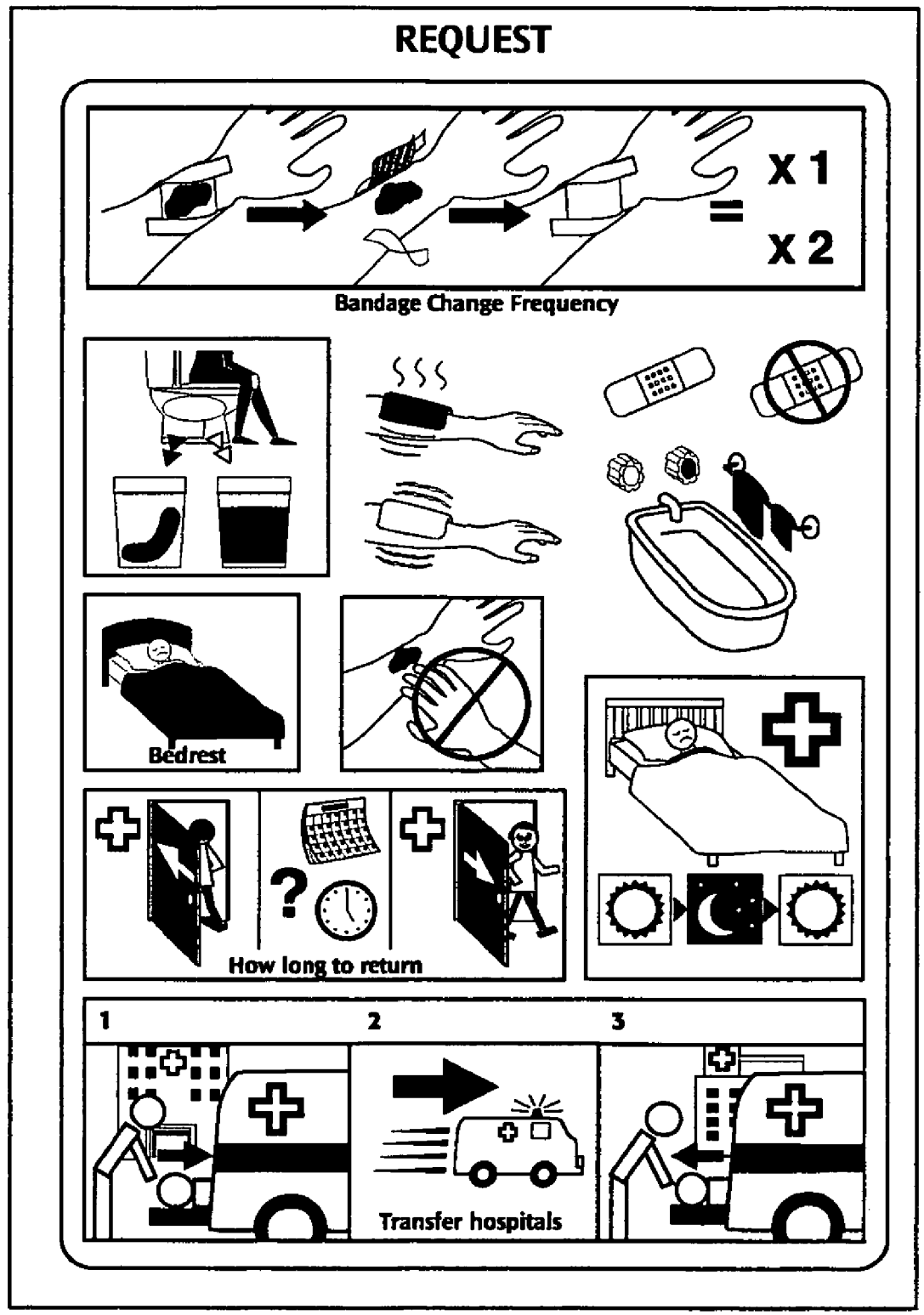

FIG. 13 depicts pictograms for treatment that is performed by the victim such as frequency for changing bandages or when to return to a doctor for a follow-up visit.

Figure 14:
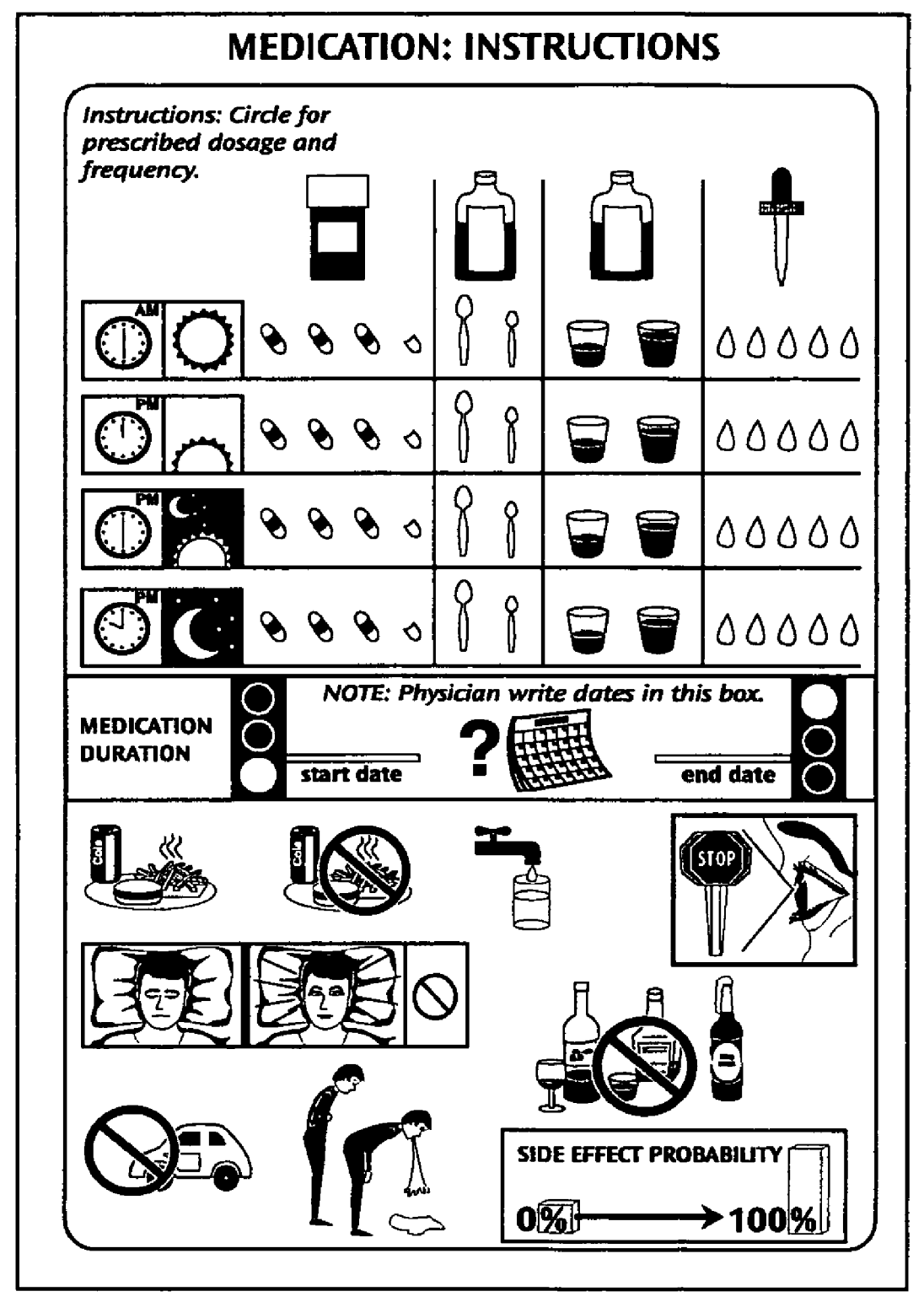
Figure 15:
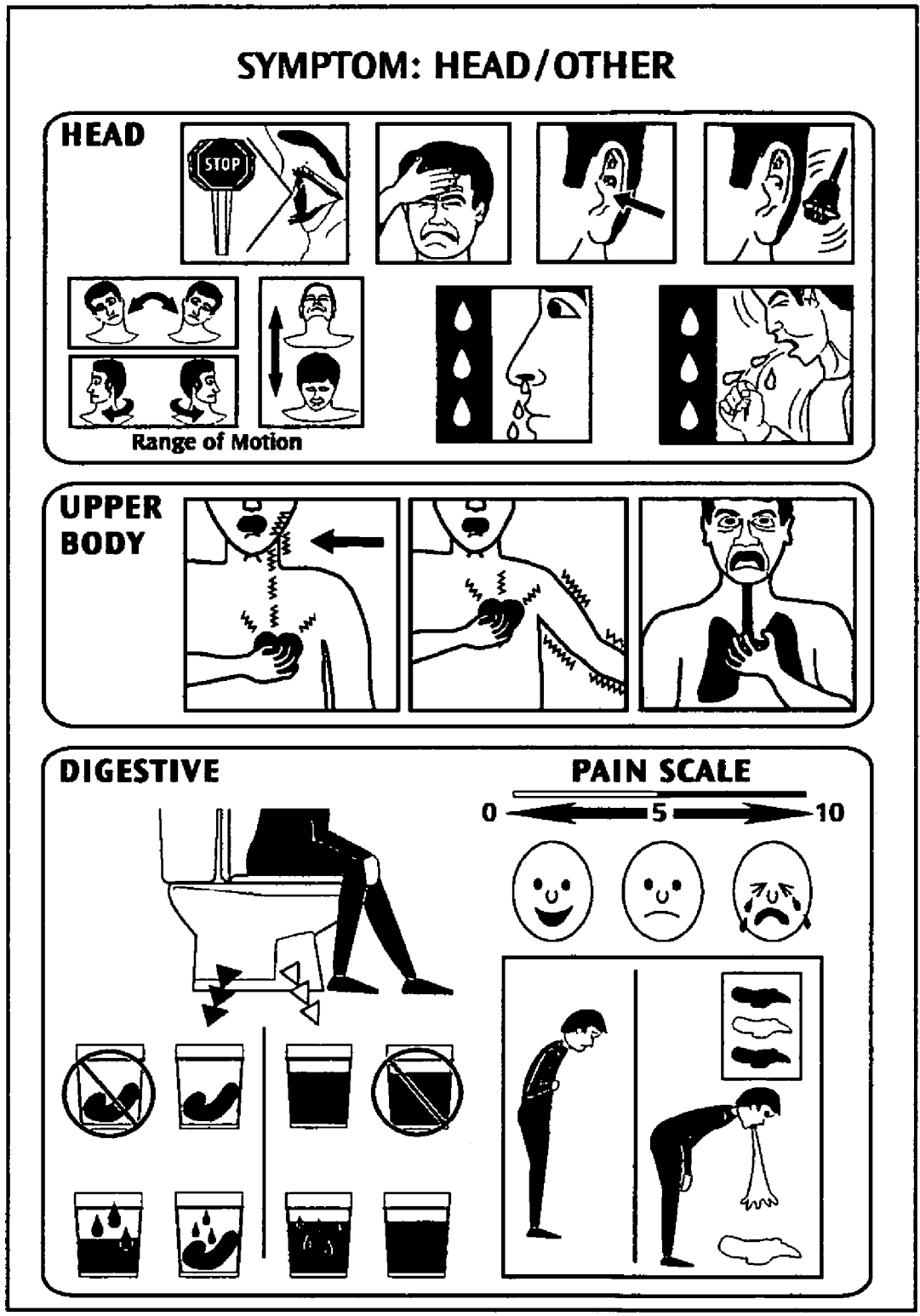

FIG. 14 depicts pictograms related to medication to be taken including when the medication should be taken and what to avoid when on the medication. FIG. 15 depicts specific types of medications such as tablets, injected medications, inhalants, liquid, etc.

Figure 16:
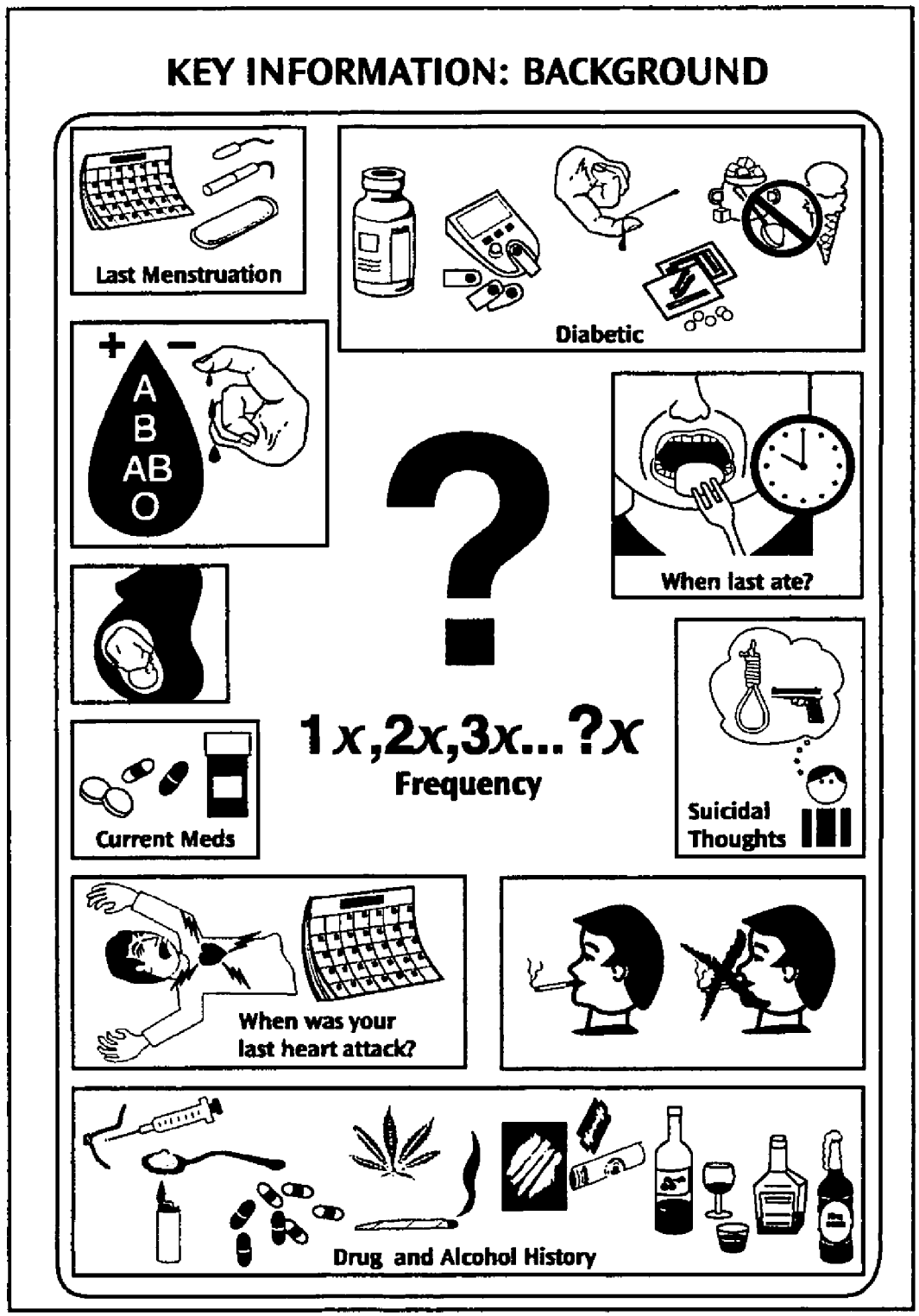

FIG. 16 depicts another general scenario where the relatively large pictogram depicts a man suffering from an allergic reaction and the plural smaller pictograms depict certain food items, medications or animals that may have caused the allergy.

Figure 17:
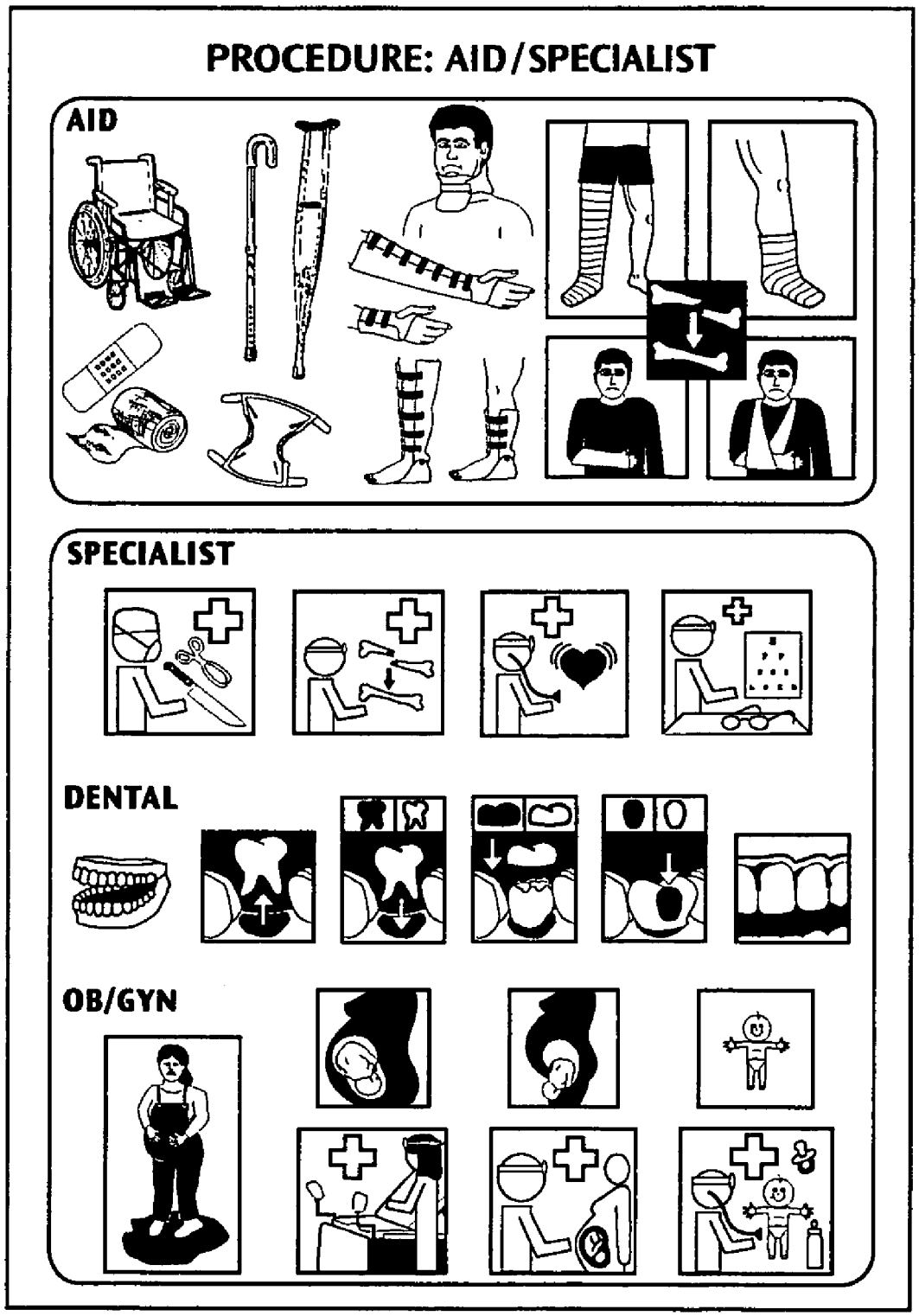

FIG. 17 shows specialist a patient may have to visit depending upon a specific medical condition.

Figure 22:
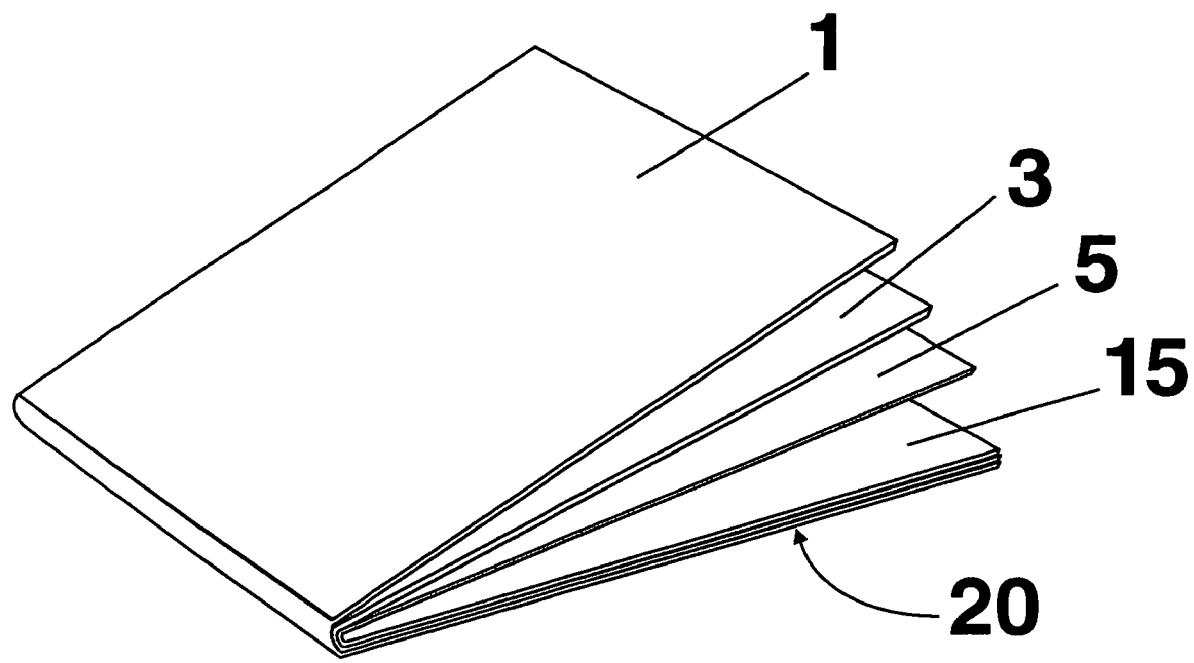
FIG. 22 shows the translator of FIG. 21 folded almost completely.
Figure 23:
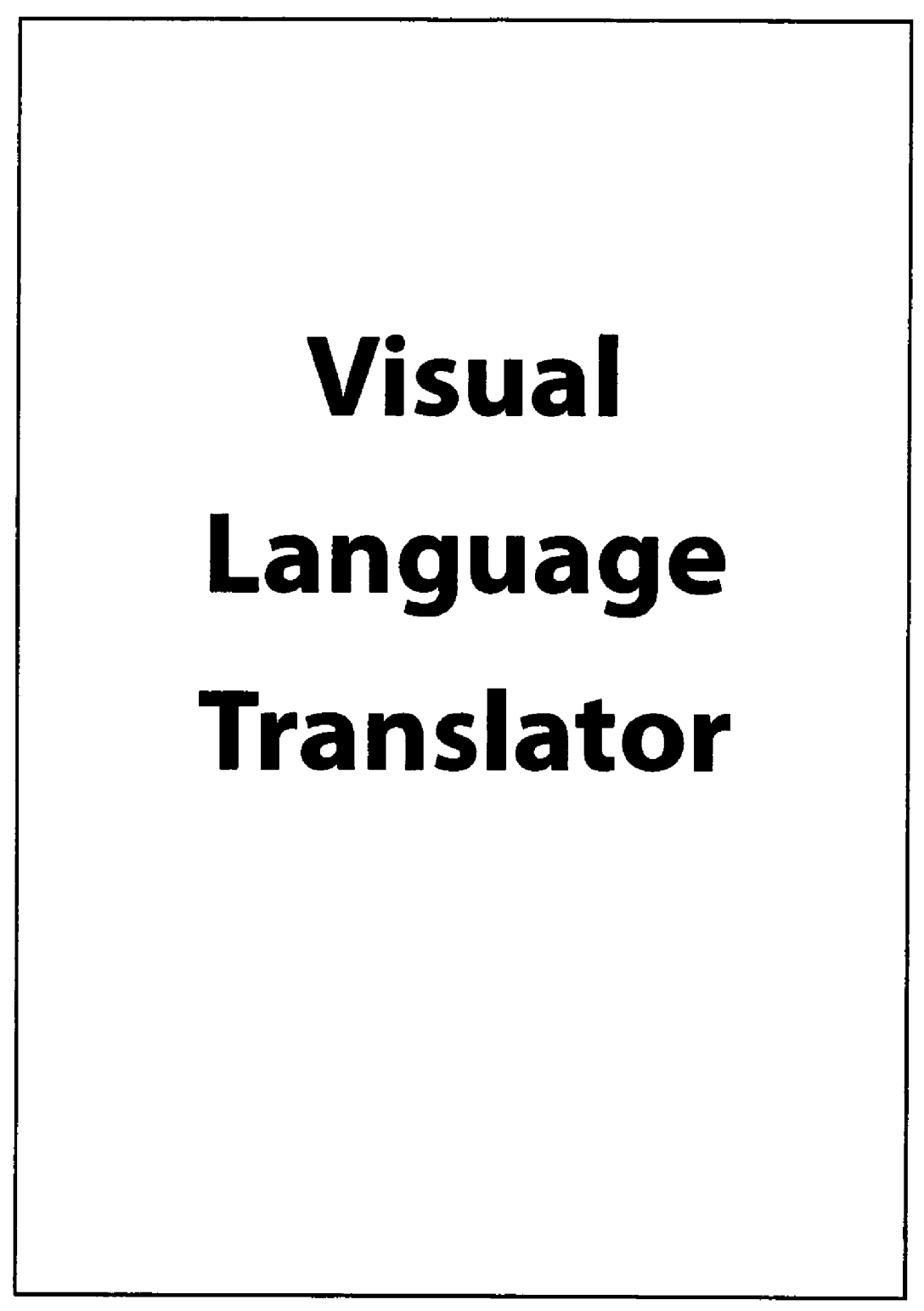

Panel 20 is on the reverse side of panel 15 and depicts FIG. 20, which in the folded position as seen in FIG. 22 is the back cover of the visual language translator. FIG. 23 shows the front cover of FIG. 1, when the translator is fully folded and ready to be stored in a pocket or other relatively small, easily accessible location.

As noted above, the medical visual translator is but one example. In a military visual translator a military stylized cover would replace panel 1. Additional panels are structured and arranged to enable dialogue between at least one of military personnel that speak different languages and military personnel and civilians. In this example, panel 2 comprises pictograms of flags of various nations. Panel 3 comprises a pictogram of a world map identifying countries of the world. Panel 4 comprises pictograms of military vehicles including military air transport and military ground transport. Panel 5 comprises pictograms of military weaponry and communication devices including artillery weaponry, bombs, handheld military weapons, land mines, military radios. Panel 6 comprises pictograms of characteristics including physical characteristics of one of military personnel, paramilitary personnel, civilians and hostile people in civilian attire, attire for one of military personnel, civilian, paramilitary and hostile people in civilian attire including colors of the attire. Panel 7 comprises pictograms of terrain, man-made structures traversing the terrain, non-public transportation for traversing the terrain and the presence of military guard posts along the terrain. Additional panels depict services and personal needs of the military personnel.

The specific pictograms shown on the translators are related to various other scenarios as noted above including maritime communication, law enforcement and humanitarian relief. These types of scenarios relate to what are considered First Responders Domain (FRD) because the people that would typically use a visual language translator would be the first on the scene whether that scene is a car accident, a crime scene, or an airport. Accordingly, various other FRDs exist such as immigration officials, jailers, and airline security personnel.

Often times, an FRD may use technical vocabulary that is specific to that domain or at least is difficult to convey and may not be known outside of people that work in that domain. Accordingly, to enhance the effectiveness of the icon, text may accompany the icon. In addition, instead of having a single icon to communicate the idea of a missile, for example, several different missiles may be depicted with a human figure adjacent the missiles to determine a size of the rocket to more accurately communicate the specific terminology associated with missiles.

An important aspect of the present invention is mapping the informational requirements of an FRD to the icons. The icons are designed to be cross-cultural so that they can be understood by any culture whether or not the language of that culture is based on the 26 letter Latin alphabet. Users of languages based on the Greek, Arabic, Chinese, Japanese or any other language equally understand the icons.

The embodiment of FIGS. 1-23 is a foldable pocket sized embodiment. However, the visual translator of the present invention can take different forms. The pictograms or icons can be placed on a grid. They can be printed on a substrate that allows use of an erasable marker. These types of displays are considered static. In a preferred embodiment, the icons are sequentially placed so that a set of images is accessible in an optimal order as dictated by the scenario at hand.

For example, in the medical visual language scenario, first the nature of the problem is communicated (What happened?). Then, symptoms and key background information are communicated. Treatments, procedure, requests for the patient are subsequently communicated so that a dialogue has been established through the use of the communicator. Such a sequence can be laid out on the static version of the communicator. However, the pictograms can also be computer generated.

Figure 24:
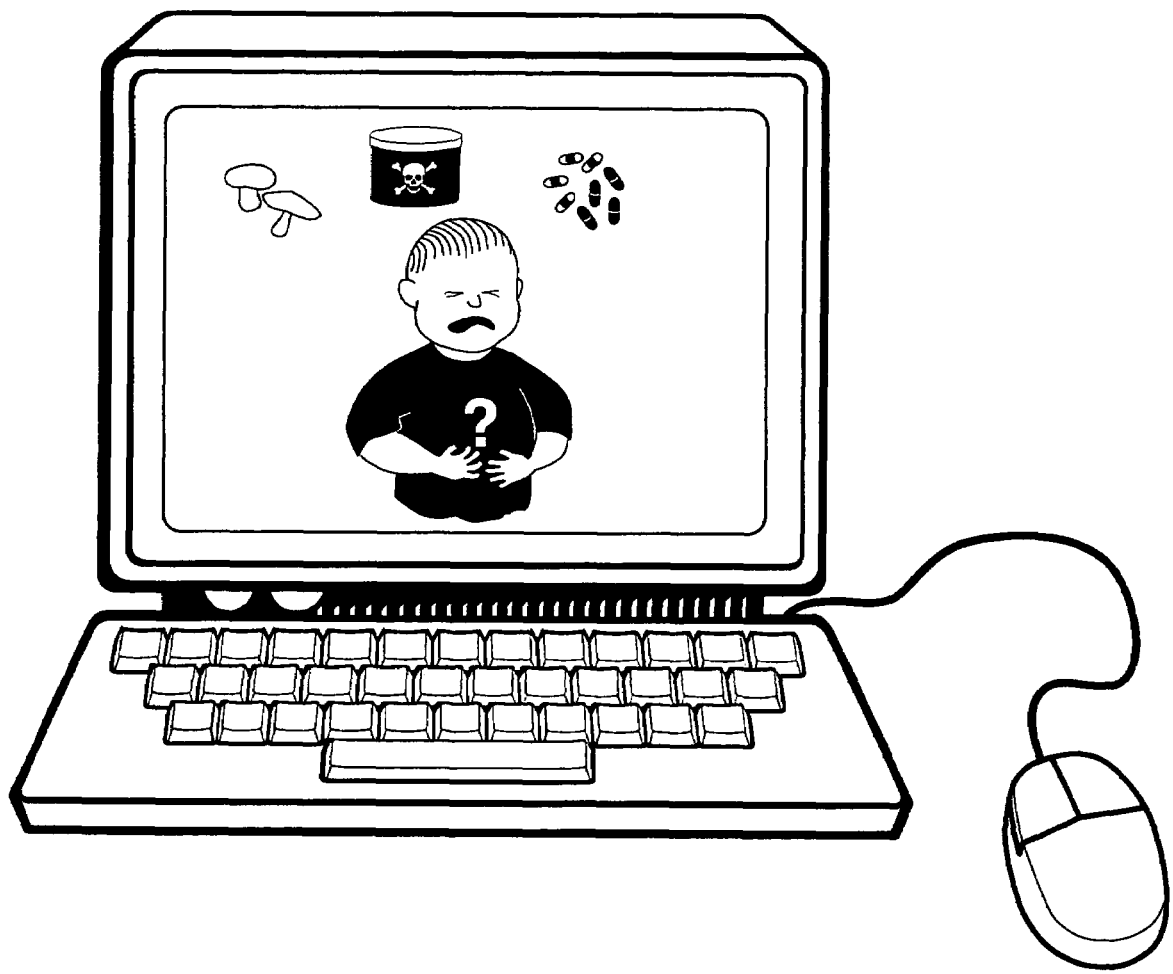
FIG. 24 shows a computer display of a large pictogram and several small pictograms related to the large pictogram.

In the embodiment of FIG. 24, the relatively large pictogram is displayed on the same screen with a plurality of the smaller pictograms that are related to the larger pictogram. However, the pictograms could be displayed in rapid linear succession. In either the static form or the computer form, the pictograms could be arranged hierarchically, sequenced and color-coded to allow a stylus or finger to point to one of the pictograms or visually scan though a plurality of pictograms. In this way, functionality and cognition are directly linked to the arrangement of the pictograms. Accordingly, a general concept is readily communicated.

When a computer display is the medium, information is quickly accessible. By having the graphics available in a rapid linear succession or in an area that can be selected from, for example a group of weapons displayed together, the information can be relayed quickly. An advantage of the computer display is that the graphics can be either static similar to the foldable device or the graphics can change.

The graphics can change to include: color, shape, brightness, speed, direction, rotation, scaling, shifts in 3-dimension perspective, patterns, gradients, shape, true animation, video, sounds, flashing, rate of flashing, etc. The computer inputs to control the display can also vary and can include: a mouse, a stylus, a light beam, head pointer, voice recognition, track ball, track pad and various other devices known to those in the computer art.

An important aspect of the invention is that a dialogue can be established. For example, in the law enforcement domain, wherein the scenario is a stolen car, pictograms denoting the scenario could be pointed to by both an officer and a bystander to determine: that it was a car that was stolen (instead of a van), the color of the car, the year, make, number of doors, status of the locks and key prior to the theft, location last seen, and relatives who may have a key etc. Accordingly, the present invention differs from the prior art teaching aids where there is no dialogue, just a monologue.

Thus the scope of the invention should be determined by the appended claims and their legal equivalents, rather than by the examples given.

I claim:

1. A method of communicating between a first responder to an event and a person at the event that is voice disabled or language challenged, by pointing to pictograms on a portable visual language translator, said portable visual language translator comprising one of a plurality of adjacent foldable panels that are attached to one another and are foldable to fit inside a pocket of a user's clothes, and a plurality of adjacent regions of a computer display, each of the panels or regions including a plurality of readily identifiable pictograms, wherein the plural pictograms are sequenced so that a set of images are accessible in an order specific to the event, said method comprising the steps of:
   presenting the language translator to the person;
   having the person point to plural ones of the pictograms on said language translator indicating an event that may require the first responders assistance; and
   pointing to said plural pictograms to lay out said order in a logical time dependent sequence to attempt to recreate the event.

2. The method as claimed in claim 1, wherein said step of having the person point comprises the person pointing to a first pictogram on said language translator indicating a general nature of the event that occurred and that may require the first responders assistance and having the person point to a second pictogram on said language translator indicating a specific nature of the event that occurred, the specific nature being directly related to the general nature.

3. The method as claimed in claim 1, further comprising the step of creating a dialogue between the first responder and the person by both the first responder and the person pointing to pictograms.

4. The method as claimed in claim 1, wherein the step of presenting the language translator comprises showing the person a computer screen displaying the pictograms.

5. The method as claimed in claim 4, wherein the pictograms are displayed in a rapid linear succession.

6. The method as claimed in claim 4, wherein each step of pointing to a pictogram comprises selecting the pictogram with a computer recognized input selected from one of a stylus, a mouse, a light beam, a head pointer, voice recognition, a track ball and a track pad.

7. The method as claimed in claim 4, wherein the pictograms are at least one of static, changeable and animated.

8. The method as claimed in claim 7, wherein the pictograms have attributes that connote additional meaning selected from at least one of color, shade, sound, speed, direction, rotation, scaling, shifts in 3-dimensional perspective, patterns, gradients, shape, true animation, video, sound, flashing, rate of flash and brightness.

9. The method as claimed in claim 1, wherein the event is one of a medical emergency, a fire and rescue disaster, a law enforcement emergency, part of a military operation, maritime communication, disaster relief and a natural event requiring humanitarian aid.

10. The method as claimed in claim 1, further comprising the step of the person sequentially pointing to a plurality of pictograms to convey a complex idea that is not conveyed by a single one of said plural pictograms.

11. A method of communicating between a first responder to an event and a person at the event that is voice disabled or language challenged, by pointing to pictograms on a portable visual language translator, said portable visual language translator comprising one of a plurality of adjacent foldable panels that are attached to one another and are foldable to fit inside a pocket of a user's clothes, and a plurality of adjacent regions of a computer display, each of the panels or regions including a plurality of readily identifiable pictograms, said method comprising the steps of:
   presenting the language translator to the person;
   having the person point to plural ones of the pictograms on said language translator indicating an event that may require the first responders assistance; and the first responder pointing to a second pictogram to indicate an action to be performed by the first responder to address the event.

12. The method as claimed in claim 11, further comprising a step of the first responder pointing to a third pictogram to indicate a procedure to be followed by the person after the action has been performed by the first responder.

13. The method as claimed in claim 11, further comprising a step of the person pointing to a plurality of pictograms on said translator to indicate information regarding the person's background prior to performing the action.

14. The method as claimed in claim 1, wherein the step of presenting the language translator comprises unfolding a pocket sized translator.

15. A method of communicating between a first responder to an event and a person at the event that is voice disabled or language challenged, by pointing to pictograms on a portable visual language translator, said portable visual language translator comprising a plurality of adjacent foldable panels that are attached to one another and are foldable to fit inside a pocket of a user's clothes, each of the panels including a plurality of readily identifiable pictograms, said method comprising the steps of:
   presenting the language translator to the person; and
   having the person point to plural ones of the pictograms on said language translator indicating an event that may require the first responders assistance,
   said step of presenting the language translator comprises unfolding said pocket sized translator, and
   further comprising the step of folding the language translator so that two panels that are not directly adjacent each other are moved adjacent each other so that additional meaning can be ascertained from the two panels.

16. A method of communicating using a portable language communicator, said portable visual language translator comprising one of a plurality of adjacent foldable panels that are attached to one another and are foldable to fit inside a pocket of a user's clothes, and a plurality of adjacent regions of a computer display, each of the panels or regions including a plurality of readily identifiable pictograms, said method comprising the steps of:
   presenting the language translator to the person,
   pointing to a first pictogram on said language translator indicating a general concept; and
   pointing to a second pictogram on said language translator indicating a specific object related to said general concept, said second pictogram being smaller than said first pictogram; wherein the plurality of pictograms are sequenced so that a set of images are accessible in an order specific to the concept and further comprising the step of pointing to said plural pictograms to lay out said order in a logical time dependent sequence to attempt to recreate an event underlying the concept.

17. The method as claimed in claim 16, wherein said first and second pictograms are adjacent each other.

18. A method of communicating, by pointing to pictograms on a portable visual language translator, said portable visual language translator comprising a plurality of adjacent foldable panels that are attached to one another and are foldable to fit inside a pocket of a user's clothes, each of the panels including a plurality of readily identifiable pictograms, said method comprising the steps of:
   presenting the language translator to a first person;
   pointing to said plural pictograms on said language translator to communicate an event,
   wherein said pointing step comprises pointing to a first pictogram on said language translator indicating a general nature of the event and pointing to at least one of plural second pictogram on said language translator indicating a specific nature of the event, the specific nature being directly related to the general nature and the first pictogram being larger than the second pictogram.

19. The method as claimed in claim 18, wherein the first and second pictograms are adjacent each other on one of said plural panels.

* * * * *